(12) United States Patent
Kuttner et al.

(10) Patent No.: US 10,673,661 B1
(45) Date of Patent: Jun. 2, 2020

(54) SIGNAL COMPONENT CANCELLATION FOR FEEDBACK RECEIVER

(71) Applicant: Intel Corporation, Santa Clara, CA (US)

(72) Inventors: Franz Kuttner, St. Ulrich (AT); Alexander Belitzer, Munich (DE); Florian Mrugalla, Munich (DE); Navatouch Deeying, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/367,601

(22) Filed: Mar. 28, 2019

(51) Int. Cl.
  *H04L 25/03* (2006.01)
  *H04B 1/10* (2006.01)

(52) U.S. Cl.
  CPC ..... *H04L 25/03821* (2013.01); *H04B 1/1027* (2013.01)

(58) Field of Classification Search
  CPC .................. H04L 25/03821; H04B 1/1027
  See application file for complete search history.

(56) References Cited

U.S. PATENT DOCUMENTS

| | | | | |
|---|---|---|---|---|
| 2016/0380706 A1* | 12/2016 | Tanzi | ............. | H04B 1/123 455/78 |
| 2017/0207862 A1* | 7/2017 | Aoki | ............. | H04B 15/00 |
| 2018/0006795 A1* | 1/2018 | Raaf | ............. | H04B 1/44 |
| 2018/0123634 A1* | 5/2018 | Settaf | ............. | H03F 3/24 |
| 2019/0081831 A1* | 3/2019 | Shakedd | ............. | H04L 27/22 |

* cited by examiner

Primary Examiner — Jean B Corrielus
(74) Attorney, Agent, or Firm — Viering, Jentschura & Partner MBB

(57) ABSTRACT

Systems, methods, and circuitries enable selected signal components to be isolated in a feedback transmit signal that includes multiple signal components. In one example, a signal component cancellation system for a feedback receiver includes a transmit chain configured to transmit a transmit signal having at least two signal components with offset center frequencies. The system includes measurement circuitry configured to measure a received signal that results from feedback of the transmit signal and cancellation circuitry configured to cancel a selected signal component from the transmit signal to generate a cancellation signal. The system further includes subtraction circuitry configured to combine the cancellation signal with the measured received signal to generate a component signal corresponding to a contribution of the selected signal component to the received signal and provide the component signal to the feedback receiver.

24 Claims, 13 Drawing Sheets

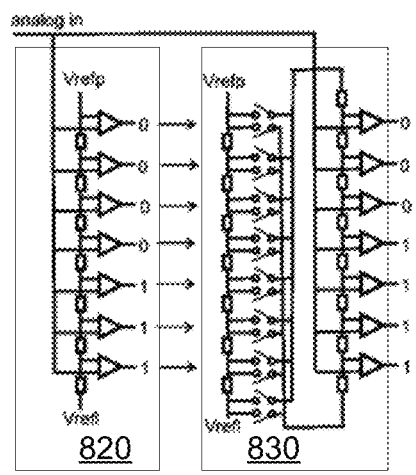 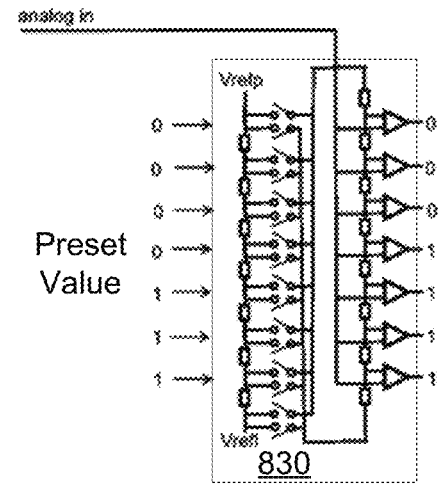
FIG. 8A　　　　　　　　FIG. 8B
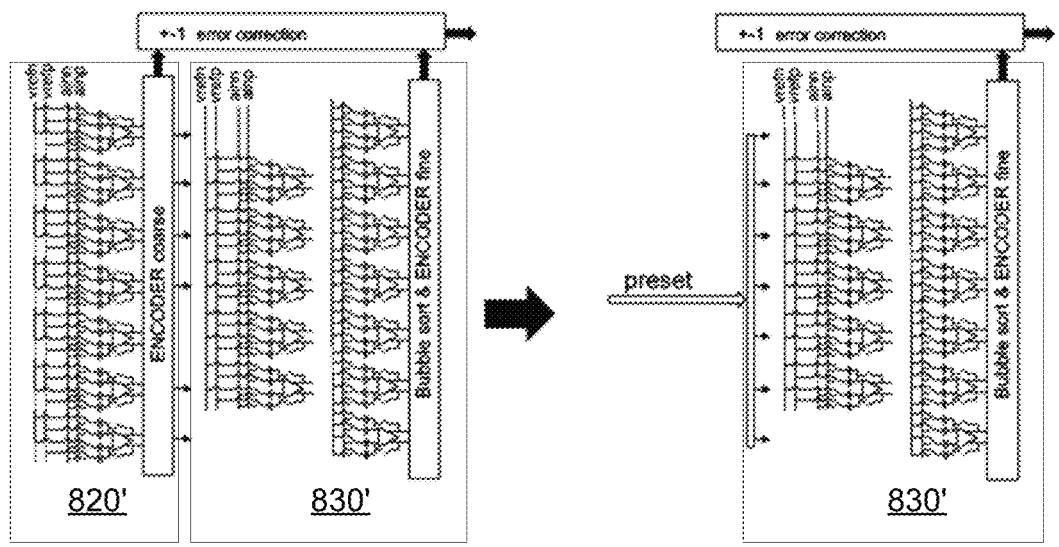
FIG. 8C

SIGNAL COMPONENT CANCELLATION FOR FEEDBACK RECEIVER

BACKGROUND

Feedback receivers are used in transmitters to characterize the signal quality of a transmit signal in selected frequency bands.

BRIEF DESCRIPTION OF THE DRAWINGS

FIGS. 8A, 8B, and 8C illustrate further aspects of the ADC of FIGS. 7A, 7B, and 7C in accordance with various aspects described.

DESCRIPTION

Figure 1:
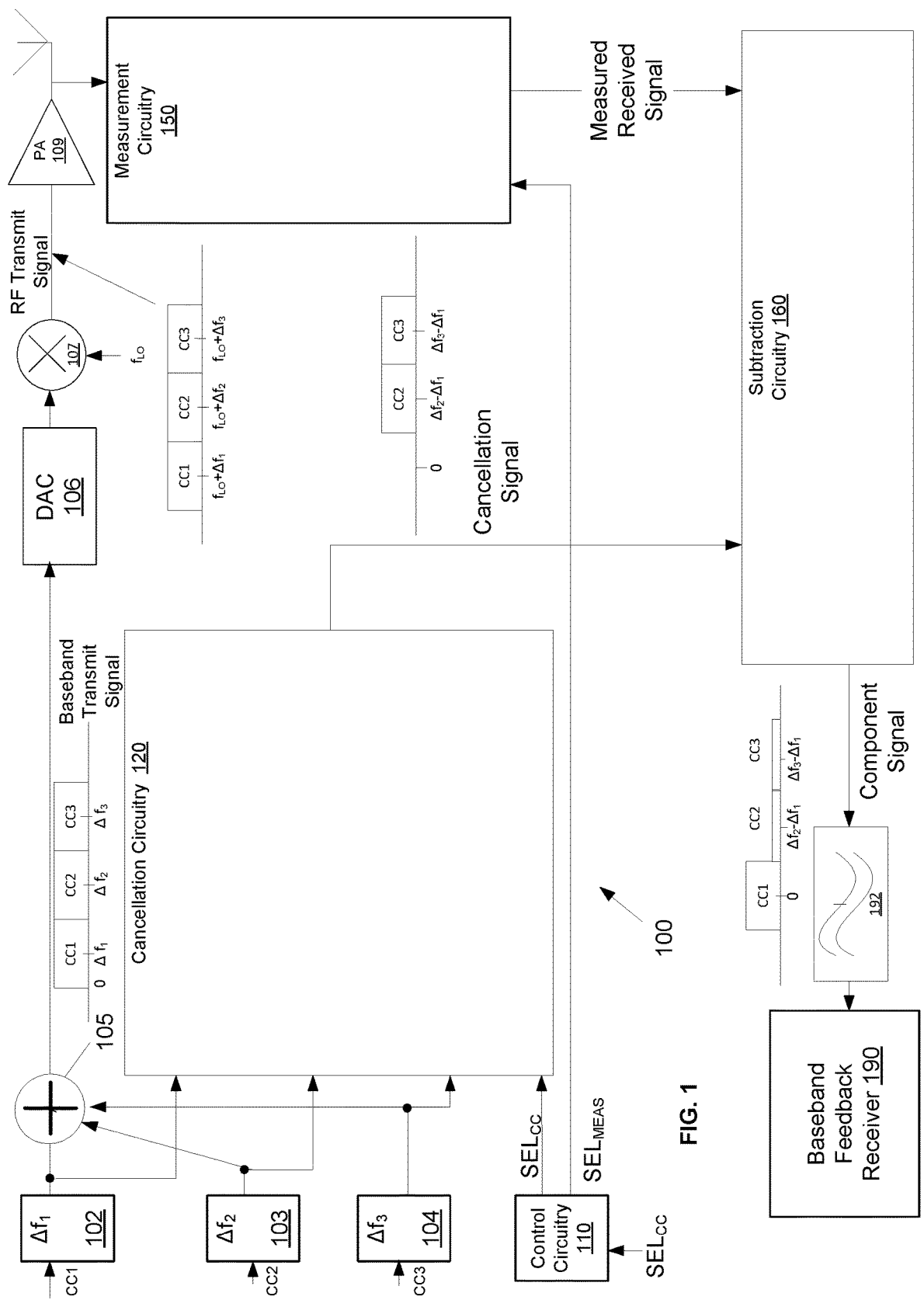
FIG. 1 illustrates an exemplary transmitter that includes a signal component cancellation system in accordance with various aspects described.

As wireless communication evolves, signal bandwidth is being increased by adding more and more component carriers (CCs) to aggregate more bandwidth within one radio frequency (RF) band. The CCs that are aggregated may be adjacent to one another in terms of frequency ("intra-band" contiguous allocation) or non-adjacent ("inter-band" non-contiguous allocation). The Long-Term Evolution (LTE) communication protocol used carrier aggregation to expand bandwidth with each product cycle, moving from two carriers of 20 MHz each to eventually five carriers to achieve 100 MHz bandwidth. Similar trends are exhibited by newly the defined fifth generation new radio (5G NR) standard which has a standard 100 MHz bandwidth (using 5 CCs) and is expected to grow to over 200 MHz.

The bandwidth requirements for feedback receivers have increased as the bandwidth of the transmit signals they characterize increases. Feedback receivers that process the entire transmit signal bandwidth in the digital domain rely on wideband analog circuitry to receive and pre-process the analog transmit signal. Wideband analog components consume significant power and involve complex topologies to achieve high performance. It is becoming infeasible to include wideband analog components capable of satisfactorily processing the increasing bandwidths of transmit signals.

Described herein are systems, circuitries, and methods that utilize knowledge about the transmit signal in the different component carriers to subtract or cancel certain component carriers' signal components from a received signal (i.e., a feedback transmit signal) prior to the received signal being provided to the digital or baseband feedback receiver. This allows the feedback receiver to operate on each component carrier separately, reducing the bandwidth requirement of the digital or baseband feedback receiver and its related analog components (e.g., low noise amplifiers, mixers, and filters in the receive path) as well as interference from other component carriers.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

Use of the word example is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

FIG. 1 illustrates a transmitter 100 configured to transmit an RF multi-component carrier transmit signal having two or more signal components with offset center frequencies. A transmit chain includes baseband processing components that process data that will be communicated by way of the RF transmit signal having a transmit frequency. The baseband processing components of the transmit chain include frequency shifting circuitries 102, 103, 104. Each frequency shifting circuitry shifts the baseband frequency of a stream of digital baseband data (the data streams are labeled CC1, CC2, and CC3) from 0 to a different offset frequency $\Delta f_1$, $\Delta f_2$, $\Delta f_3$. The resulting baseband signal components will have offset baseband center frequencies. The baseband signal components are combined by combination circuitry 105 to generate a baseband transmit signal that includes the different baseband signal components (each corresponding to one of the data streams CC1, CC2, CC3) as shown in FIG. 1. Depending on the carrier aggregation scheme in use, the data encoded in the three streams may be the same or different. While three signal components will be illustrated in this description for simplicity sake, it is likely that at least several more baseband signal components would be included in the baseband transmit signal and processed by signal component cancellation systems and methods as described herein.

The transmit chain includes a digital-to-analog converter (DAC) 106 that converts the digital baseband transmit signal to an analog baseband signal which is then up-converted with a mixer 107 using a local oscillator signal having the RF operating frequency of the transmitter. A power amplifier 109 amplifies the resulting RF transmit signal for transmission by the antenna. The transmitter 100 includes a baseband feedback receiver 190 that characterizes many aspects (e.g., power, signal correctness, signal quality, phase, linearity, and so on) of the "received signal", which is the fed back RF transmit signal received by way of a feedback path, on a per component carrier basis. In one example, the feedback receiver measures full vector information of the received signal in both amplitude and phase (e.g., Ipath and Qpath). The per component carrier power characterization performed by the baseband feedback receiver 190 is used to control power and gain for transmitter components, among other parameters.

As discussed above designing a feedback receiver, and related analog low-pass filter 192, that can cope with large bandwidth transmit signals includes using wideband analog components that are relatively complex and consume significant power. To reduce the complexity of the feedback receiver, the transmitter 100 includes a signal component cancellation system that is configured to cancel one or more selected signal components from the received signal so that the bandwidth requirement of the feedback receiver 190 and the filter 192 can be reduced. Each signal component can be analyzed in turn by the feedback receiver 190. In one example, all signal components can be cancelled to analyze a noise level of the transmitter 100. For the purposes of illustration in this description the component carrier CC1 will be the "selected signal component" to be analyzed by the feedback receiver. Of course any of the other signal components and combinations of signal components can be isolated for analysis by the signal component cancellation system.

Figure 2:
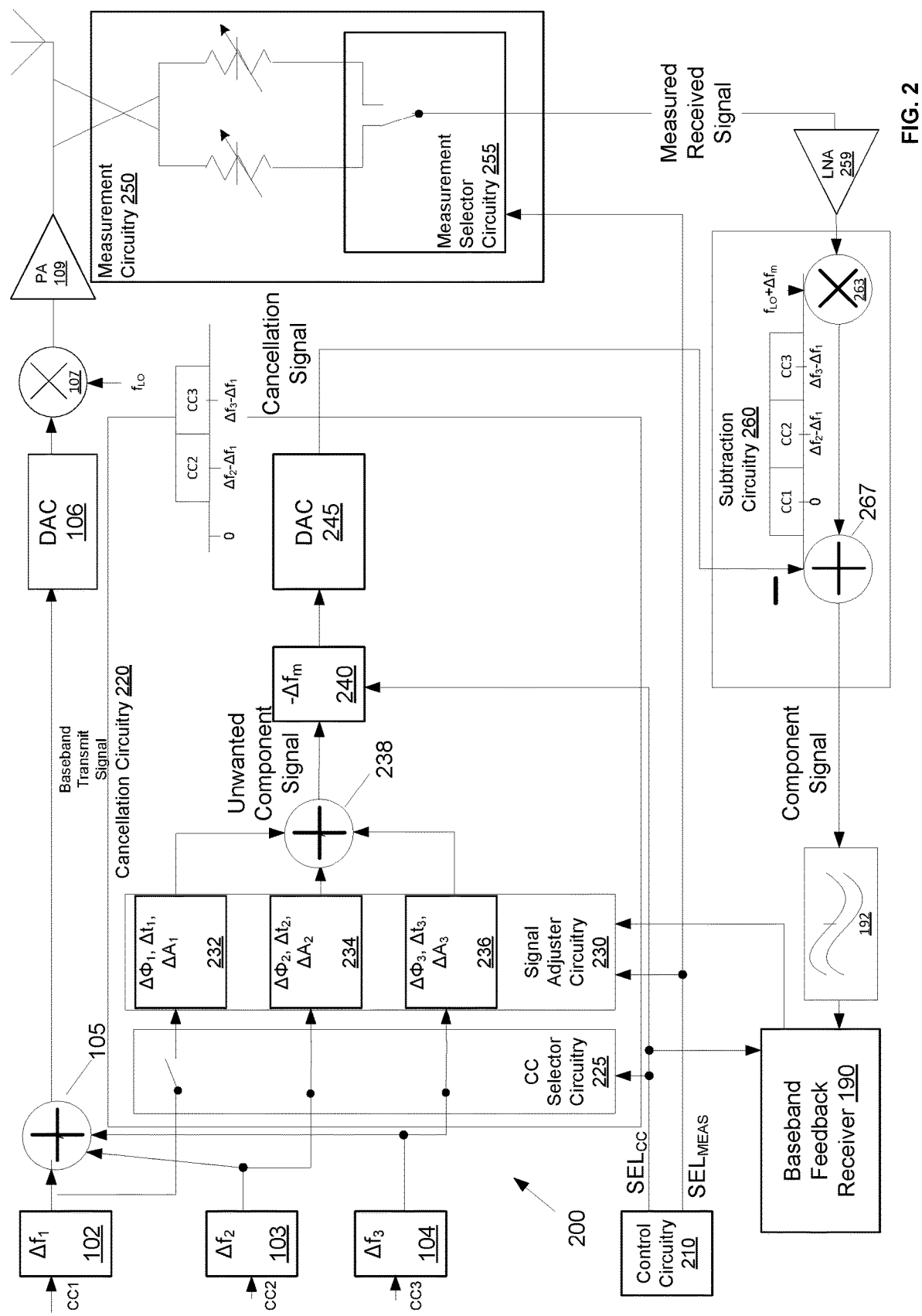
FIG. 2 illustrates an exemplary transmitter that includes a signal component cancellation system that cancels unwanted signal components from a received signal in the baseband domain in accordance with various aspects described.
Figure 3:
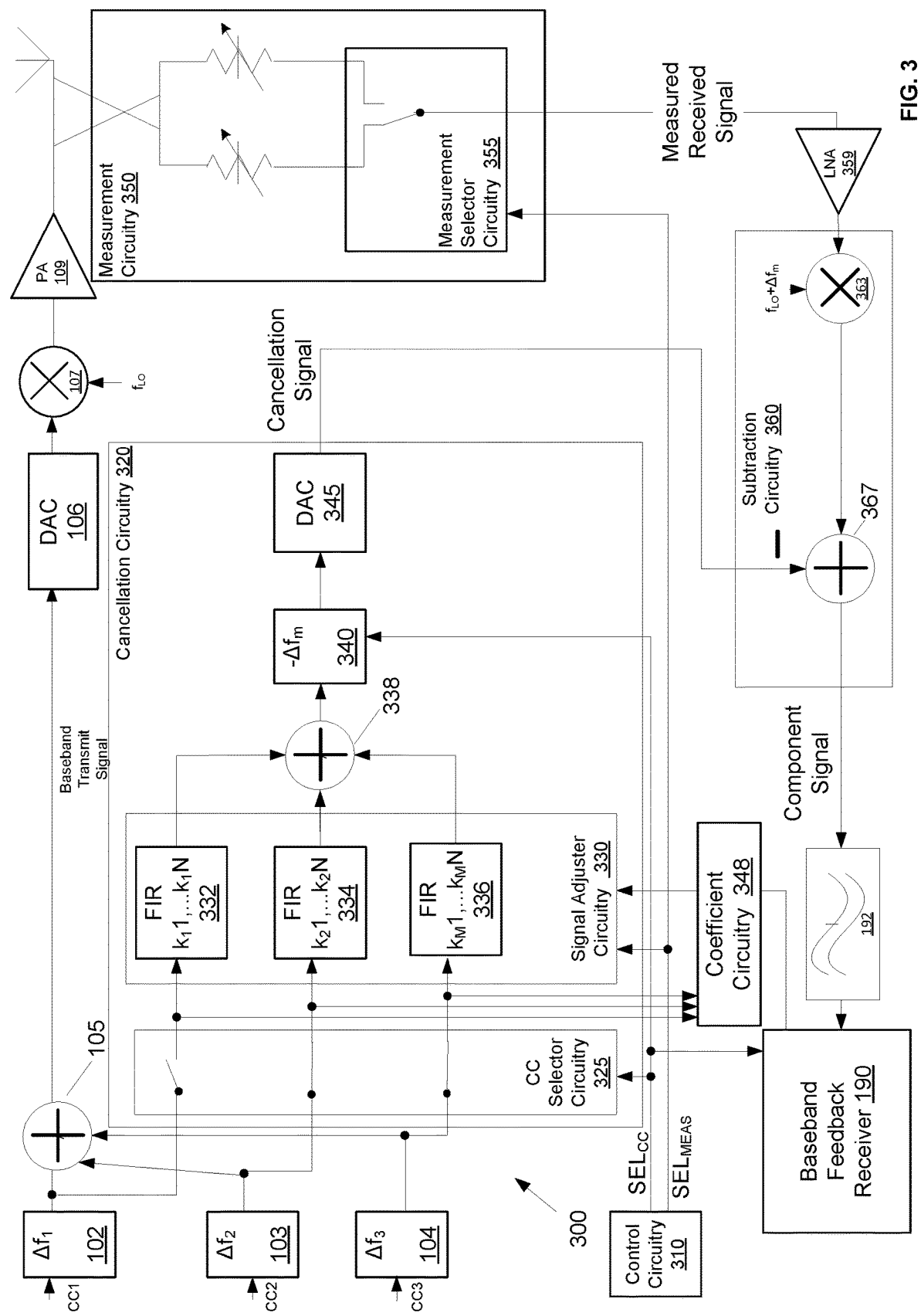
FIG. 3 illustrates an exemplary transmitter that includes a signal component cancellation system that cancels unwanted signal components from a received signal in the baseband domain in accordance with various aspects described.
Figure 4:
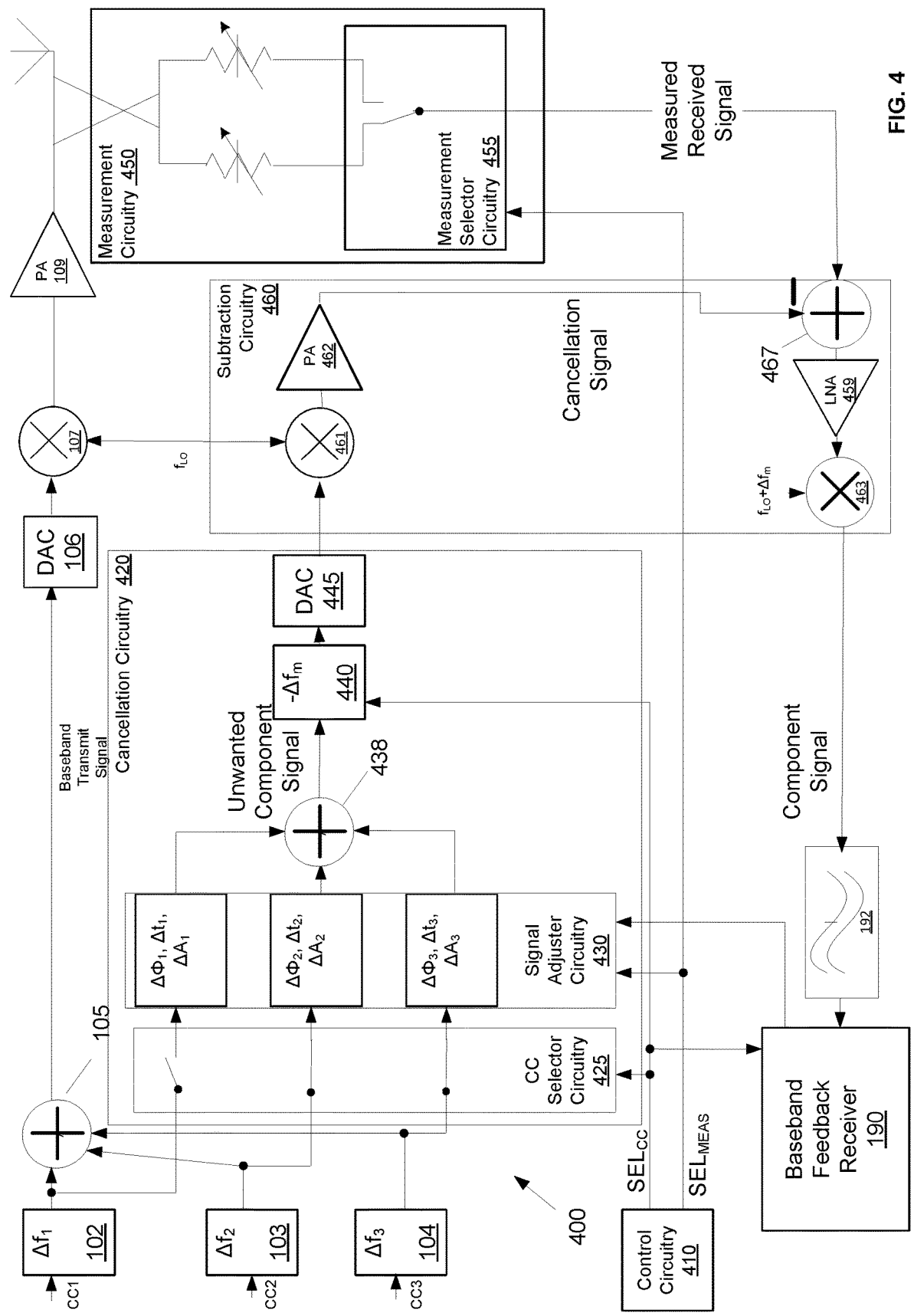
FIG. 4 illustrates an exemplary transmitter that includes a signal component cancellation system that cancels unwanted signal components from a received signal in the RF domain before amplification of the received signal in accordance with various aspects described.
Figure 5:
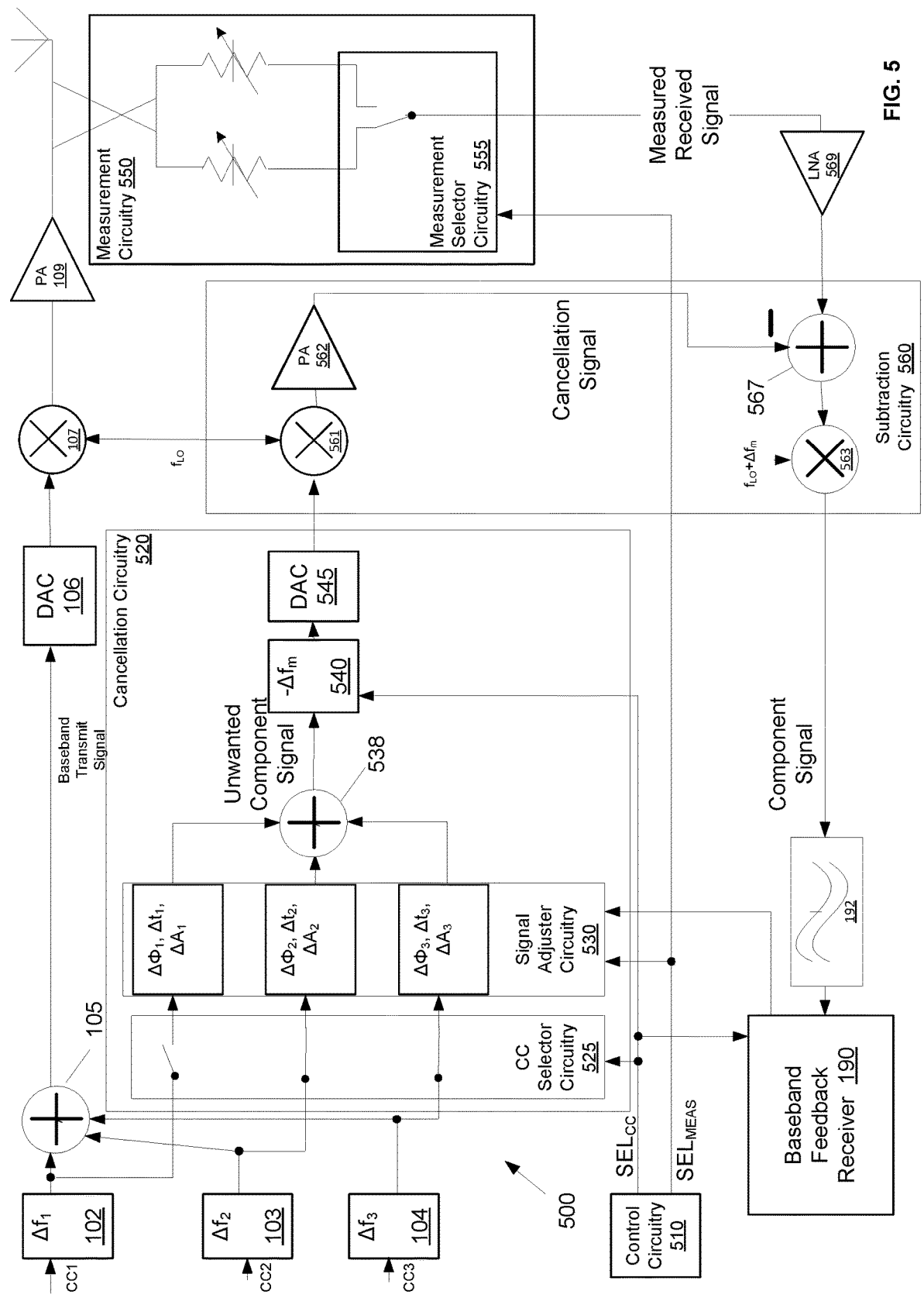
FIG. 5 illustrates an exemplary transmitter that includes a signal component cancellation system that cancels unwanted signal components in a received signal in the RF domain after amplification of the received signal in accordance with various aspects described.
Figure 6:
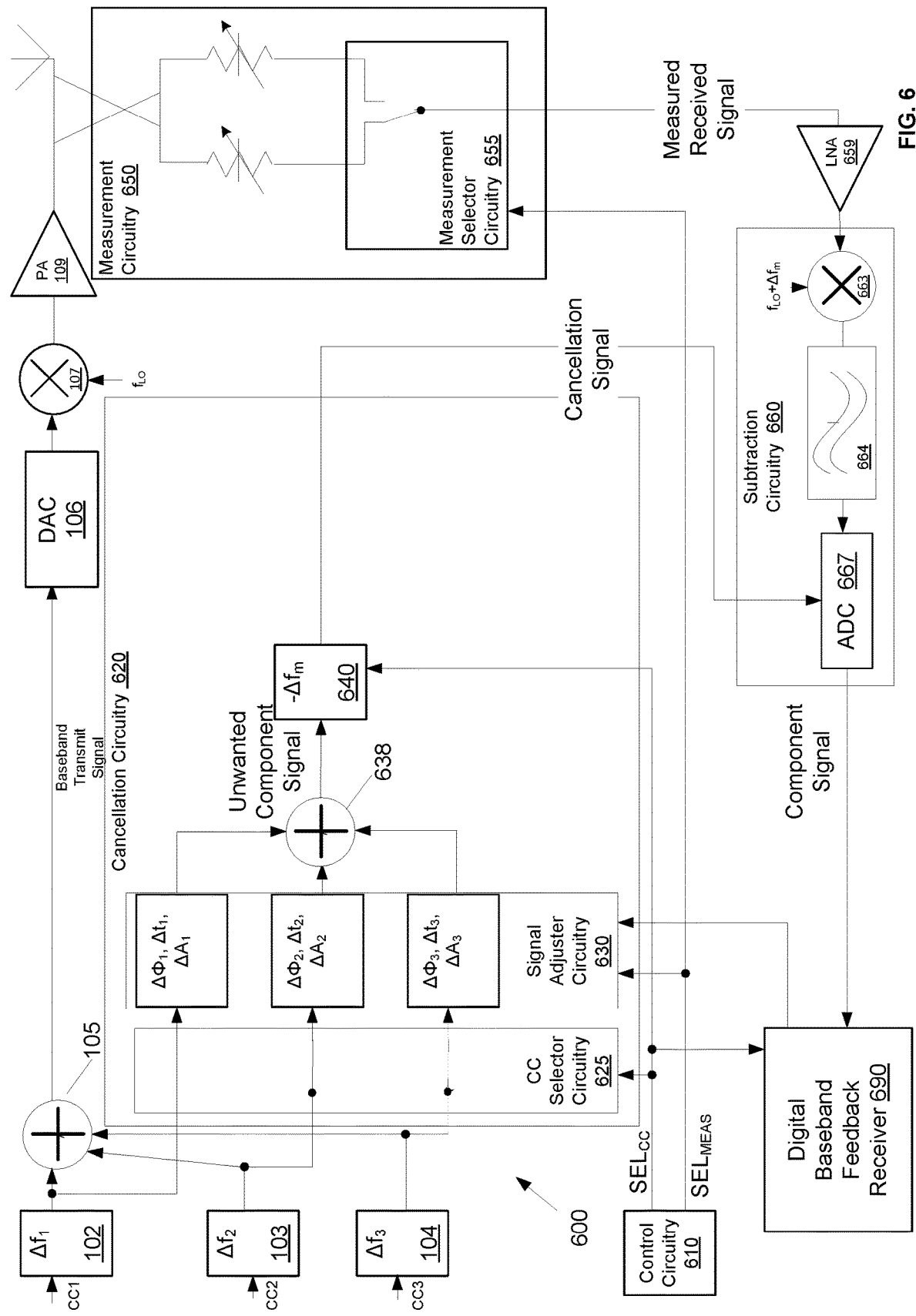
FIG. 6 illustrates an exemplary transmitter that includes a signal component cancellation system that includes an analog-to-digital converter (ADC) that cancels unwanted signal components in a received signal and converts the resulting signal to a digital signal in accordance with various aspects described.

The signal component cancellation system includes control circuitry 110, cancellation circuitry 120, measurement circuitry 150, and subtraction circuitry 160. The cancellation circuitry 120 is controlled by the control circuitry 110 to generate a cancellation signal. The cancellation signal is used to cancel a selected signal component $SEL_{CC}$ from the transmit signal (sometimes in the baseband domain as shown in FIGS. 2, 3 and 6 or in the RF domain as shown in FIGS. 4 and 5). The measurement circuitry 150 is controlled by the control circuitry 110 to measure the received signal. The subtraction circuitry 160 is configured to combine the cancellation signal with the measured received signal to generate a component signal corresponding to an isolated contribution of the selected signal component to the received signal.

The component signal includes the contribution of the selected signal component(s) to the received signal in the selected component carrier as well as the contribution of the selected signal component(s) to the other component carriers (at much lower power, meaning less need for high suppression adjacent component carriers by the feedback receiver). The component signal does not include the contributions of the non-selected signal components as these contributions are modelled by the cancellation signal generated by the cancellation circuitry 120 and subtracted from the received signal by the subtraction circuitry 160. The component signal is provided to the feedback receiver 190, which now need only cope with the bandwidth of one component carrier rather than the whole transmitted spectrum.

FIG. 2 illustrates a transmitter 200 that includes the same transmit chain, feedback receiver 190, and low pass filter 192 as the transmitter illustrated in FIG. 1 as well as an exemplary signal component cancellation system. The control circuitry 210 generates control signals for a cancellation circuitry 220 that communicate which signal components $SEL_{CC}$ are to be cancelled from the received signal based on which component carrier has been selected. Cancellation circuitry 220 generates a cancellation signal corresponding to un-selected carrier components.

The cancellation circuitry 220 includes component carrier selector circuitry 225 configured to receive all of the signal components CC1, CC2, and CC3 output by the frequency shifters 102, 103, 104, and pass signal components that are not the selected signal component. In the illustrated example CC2 and CC3 are passed because CC1 is the selected signal component. In one example, the component carrier selector circuitry 225 includes a bank of separately controlled switches, one in series with a path for each component carrier.

The cancellation circuitry 220 also includes signal adjuster circuitry 230 configured to adjust a phase, magnitude, and time delay of each of the passed signal components to align the passed signal components with a phase and magnitude of the measured received signal. The signal adjuster circuitry 230 includes component adjuster circuitries 232, 234, 236 that each adjust a corresponding signal component in phase and magnitude. This phase, magnitude, and time delay adjustment reflects the frequency response of the channel from a mixer to a subtractor (e.g., subtraction circuitry 260) which is different for each component carrier. To obtain high suppression of the un-selected component carriers, the signal adjuster obtains the feedback receiver's channel characterization configuration of the selected signal component. The signal adjuster circuitry 230 uses that configuration to modify the phase, amplitude, and time delay adjustments made by the component signal adjuster for the selected component carrier to reflect the most present channel behaviors.

The frequency response of the channel is also different for the forward wave component (FW) of the transmit signal and the reflected wave component (RW) of the transmit signal. To compensate for this, the control circuitry 210 controls measurement selector circuitry 255 in the measurement circuitry (using the $SEL_{MEAS}$ signal) to measure either the FW or RW of the transmit signal. The control circuitry 210 controls the signal adjuster 230 use a different set of adjustment parameters for each signal component depending on whether the FW or RW of the transmit signal is being measured.

A combination circuitry 238 is configured to add the adjusted passed signal components passed by the component carrier selector circuitry to generate an unwanted component signal. A frequency shifter 240 is configured to shift a frequency of the unwanted component signal by a center frequency of the selected signal component ($\Delta f_m$) to generate the cancellation signal. This is because the down-conversion of the feedback receiver is performed at the frequency of the selected component carrier. A digital-to-analog converter (DAC) 245 is used to convert the digital baseband cancellation signal to an analog baseband signal.

The subtraction circuitry 260 includes a mixer 263 configured to down-convert the measured received signal based on the center frequency of the selected signal component (resulting in an analog baseband signal like the analog baseband cancellation signal) and a subtractor element 267 configured to subtract the cancellation signal from the down-converted measured received signal to generate the component signal. The subtractor element 267 may subtract the cancellation signal from the measured received signal in the voltage or current domain, but the subtraction should be performed in the IQ domain configuration for complex subtraction. After subtraction, the power of the un-selected component signals is now much lower. Therefore, the need for high suppression for adjacent component carriers is relaxed. Because the cancellation is done after the measured received signal is attenuated the inclusion of the cancellation path does not consume as much power as a main transmission path.

Figure 2A:
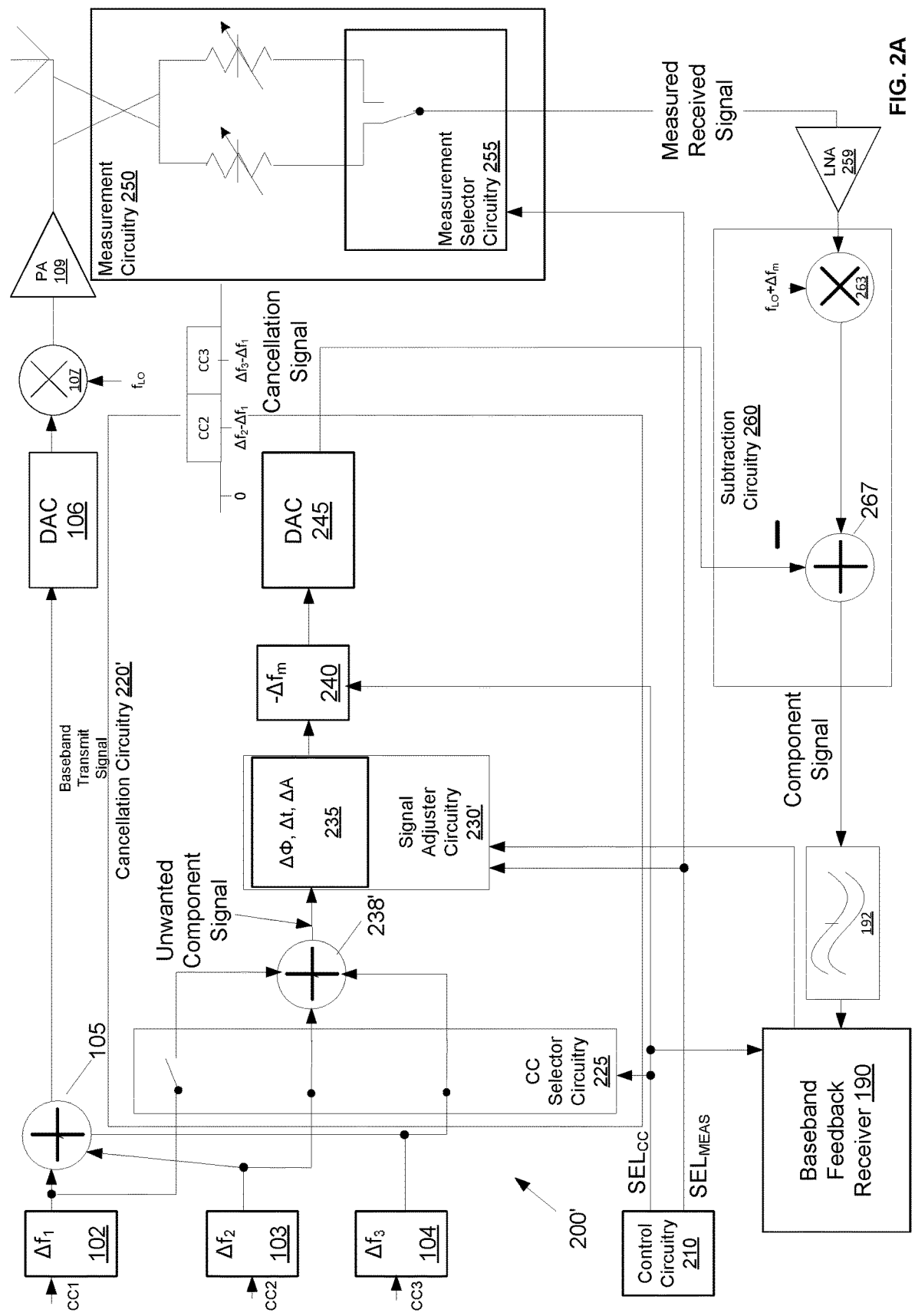
FIG. 2A illustrates an exemplary transmitter that includes a signal component cancellation system that cancels unwanted signal components from a received signal in the baseband domain in accordance with various aspects described.

FIG. 2A illustrates a transmitter 200' that is similar to transmitter 200 of FIG. 2 except that cancellation circuitry 220' includes combination circuitry 238' that combines the passed signal components to generate the unwanted component signal before the signal is adjusted by signal adjuster circuitry 230'. The signal adjuster circuitry 230' includes an adjuster circuitry 235 that is configured to adjust a phase, magnitude, and time delay of the unwanted component signal to align the unwanted component signal with a phase and magnitude of the measured received signal. This phase and magnitude adjustment reflects the frequency response of the channel from the mixer 107 to a subtractor (e.g., subtraction circuitry 260) for the entire channel.

To obtain high suppression of the un-selected component carriers, the signal adjuster obtains the feedback receiver's channel characterization configuration of the feedback signal. The signal adjuster circuitry 230' uses that configuration to modify the phase, amplitude, and time delay adjustments made by the signal adjuster 235 to reflect the most present channel behaviors. The frequency shifter 240 is configured to shift a frequency of the adjusted unwanted component signal by a center frequency of the selected signal component ($\Delta f_m$) to generate the cancellation signal. The remainder of the cancellation circuitry components function in a manner similar that described in FIG. 2 and will not be described here. While the optional switching of the positions of the combination circuitry 238 and the signal adjuster circuitry 230 are illustrated in FIGS. 2A and 3A, the analogous components in FIGS. 4, 5, and 6 may also be switched.

FIG. 3 illustrates a transmitter 300 with an exemplary cancellation circuitry 320. A signal adjuster circuitry 330 includes finite impulse response (FIR) filters 332, 334, 336 that each process a signal component passed by CC selector circuitry 325. Each FIR filter operates based on a plurality of coefficients. In one example, each FIR filter uses five complex coefficients. A coefficient circuitry 348 receives the feedback signal and each of the individual frequency shifted component signals (e.g., a stream of IQ data for each component signal CC1, CC2, CC3). The coefficient circuitry 348 determines coefficients (e.g., using least mean square (LMS) or other technique) that provide the proper time alignment between the feedback signal and the cancellation signal as well as the correct gain scaling and phase rotation of the cancellation signal. When complex FIR coefficients are used time shift, phase shift, and gain scaling can be performed simultaneously.

The coefficient circuitry 348 trains or calibrates the coefficients for each FIR filter 332, 334, 336 in the signal adjuster circuitry 330 on a per-channel individual basis (e.g., one after another). In other examples, the coefficient circuitry 348 determines coefficients for all channels simultaneously. The fit of the coefficients may be done using an LMS algorithm, direct learning with matrix inversion, indirect learning using LMS, recursive mean square, or any other appropriate technique. The calibration of the FIR filter coefficients can be performed periodically, as needed due to changes in operating conditions.

Figure 3A:
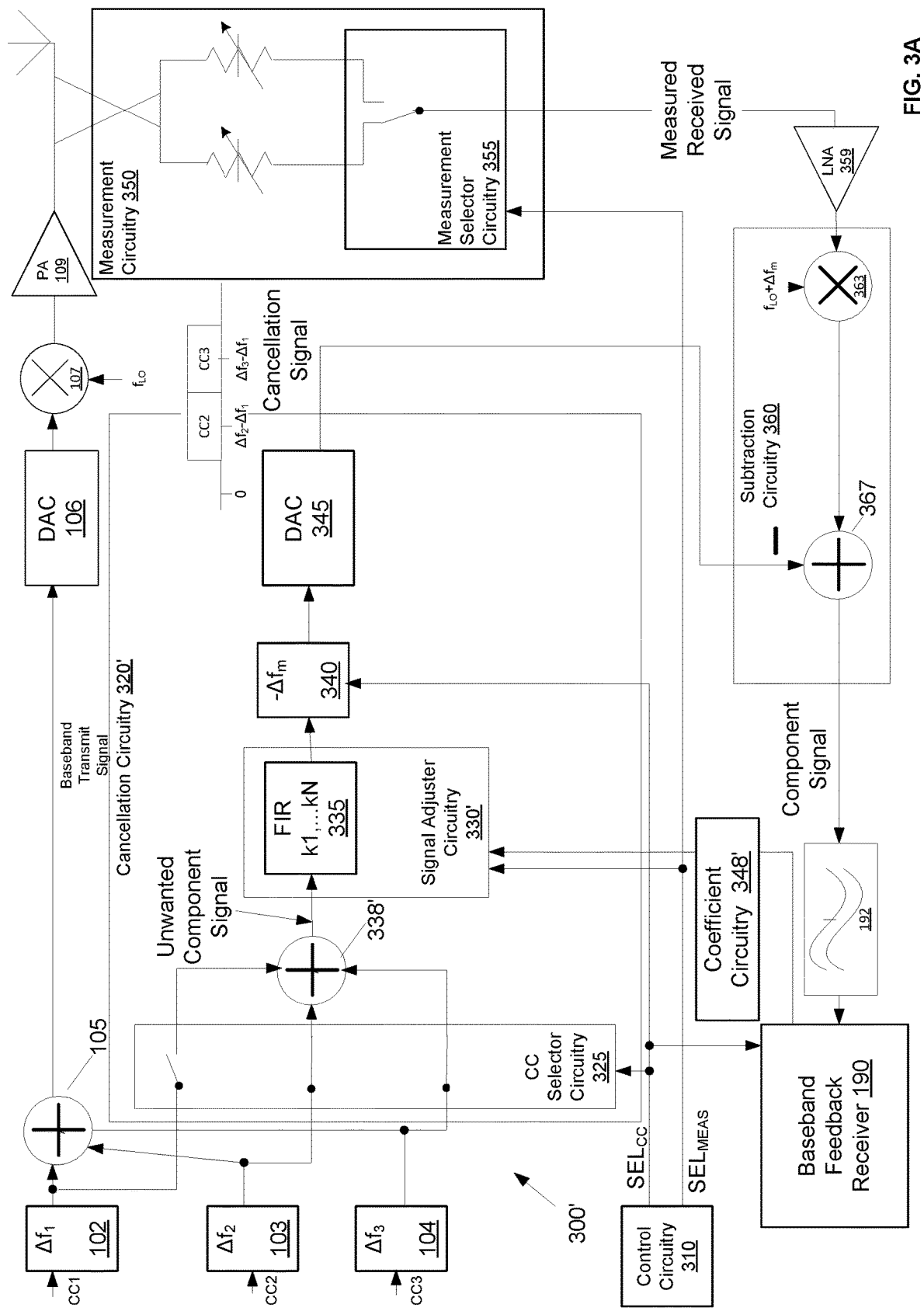
FIG. 3A illustrates an exemplary transmitter that includes a signal component cancellation system that cancels unwanted signal components from a received signal in the baseband domain in accordance with various aspects described.

FIG. 3A illustrates a transmitter 300' that is similar to the transmitter 300 of FIG. 3 except that cancellation circuitry 320' includes combination circuitry 338' that combines the passed signal components to generate the unwanted component signal before the signal is adjusted by signal adjuster circuitry 330'. The signal adjuster circuitry 330' includes a finite impulse response (FIR) filter 335 that processes the unwanted component signal. The FIR filter operates based on a plurality of coefficients. In one example, the FIR filter uses five complex coefficients. A coefficient circuitry 348' receives the feedback signal and determines coefficients (e.g., using least mean square (LMS) or other technique) that provide the proper time alignment between the feedback signal and the cancellation signal as well as the correct gain scaling and phase rotation of the cancellation signal. When complex FIR coefficients are used time shift, phase shift, and gain scaling can be performed simultaneously.

The coefficient circuitry 348' trains or calibrates the coefficients for the FIR filter 335 for all channels simultaneously. The fit of the coefficients may be done using an LMS algorithm, direct learning with matrix inversion, indirect learning using LMS, recursive mean square, or any other appropriate technique. The calibration of the FIR filter coefficients can be performed periodically, as needed due to changes in operating conditions.

The signal component cancellation systems illustrated in FIGS. 2, 2A, 3, and 3A cancel the unwanted signal components from the measured received signal in the analog baseband domain. FIGS. 4 and 5 illustrate transmitters 400, 500, respectively that include signal component cancellation systems that cancel the unwanted signal components from the measured received signal in the analog RF domain. Turning first to FIG. 4, subtraction circuitry 460 includes a first mixer 461 configured to use the transmit LO signal to up-convert the cancellation signal to the RF domain. A low power amplifier (PA) 462 amplifies the up-converted signal to generate the cancellation signal, which is an analog RF signal. A subtractor element 467 subtracts the up-converted cancellation signal from the measured received signal to generate and the resulting signal (e.g., an RF component signal) is amplified by LNA 459. A second mixer 463 down-converts the RF component signal based on a center frequency of the selected signal component to generate an analog baseband component signal for use by the feedback receiver 190. Note that the subtractor element 467 provides the component signal to the low noise amplifier 459, which is disposed between the subtractor element and the second mixer 463. This arrangement allows the linearity specification for the LNA to be relaxed because the LNA is processing an attenuated signal.

FIG. 5 illustrates a transmitter 500 that includes an exemplary subtraction circuitry 560. Like the subtraction circuitry 460 of FIG. 4, the subtraction circuitry 560 includes a first mixer 462 configured to use the transmit LO signal to up-convert the cancellation signal to the RF domain. A low power amplifier (PA) 562 amplifies the up-converted signal to generate the cancellation signal, which is an analog RF signal. A subtractor element 567 subtracts the up-converted cancellation signal from a measured received signal that has been already amplified by LNA 569. A second mixer 563 down-converts the RF component signal based on a center frequency of the selected signal component to generate an analog baseband component signal for use by the feedback receiver 190. Note that the subtractor element 567 subtracts the cancellation signal from the output of the low noise amplifier 569, which is disposed in the feedback path before the subtractor element. This arrangement allows the LNA 569 and the PA 562 to be designed as transconductance amplifiers that perform the subtraction in the current domain, which is simpler to implement than voltage-domain subtraction.

The feedback receiver 190 of FIGS. 1-5 includes an internal analog-to-digital converter (ADC) that converts the analog baseband component signal to a digital signal for digital processing. The internal ADC of the feedback receiver is one of the components that is becoming increasingly difficult to design and implement as bandwidths increase. FIG. 6 illustrates a transmitter 600 that includes a signal component cancellation system in which the subtraction of the cancellation signal from the measured component signal is done by an ADC 667 that is external to a digital feedback receiver 690. The ADC 667 subtracts the cancellation signal from the measured received signal, which is filtered by anti-aliasing filter 664, and converts the resulting component signal to a digital signal for use by a digital baseband receiver 690. In this manner, the ADC 667 performs both filtering and subtraction functions and also need act on a smaller bandwidth signal, reducing the bandwidth requirement for the ADC 667. In one example, the ADC 667 is a sigma-delta ADC which includes an internal filter that may be used in place of anti-aliasing filter 664.

Figure 7A:
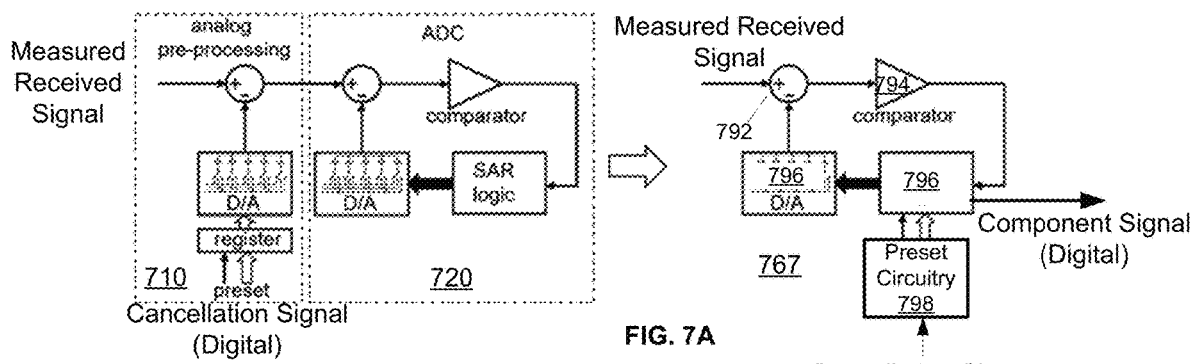
FIGS. 7A, 7B, and 7C illustrate various aspects of an exemplary ADC that may be utilized in the transceiver of FIG. 6 in accordance with various aspects described.
Figure 7B:
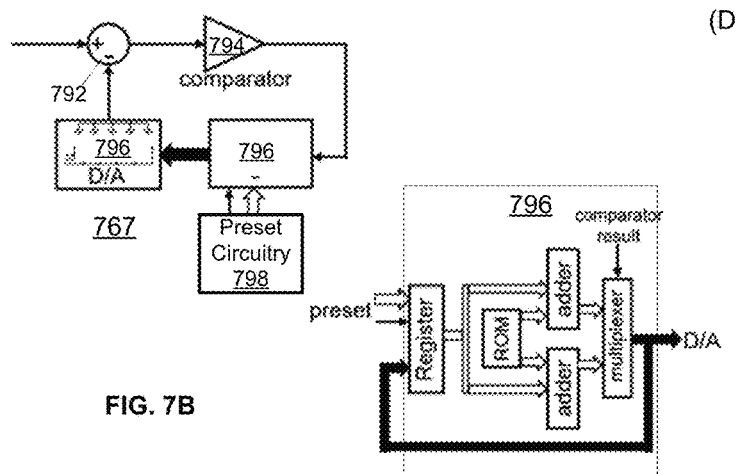
Figure 7C:
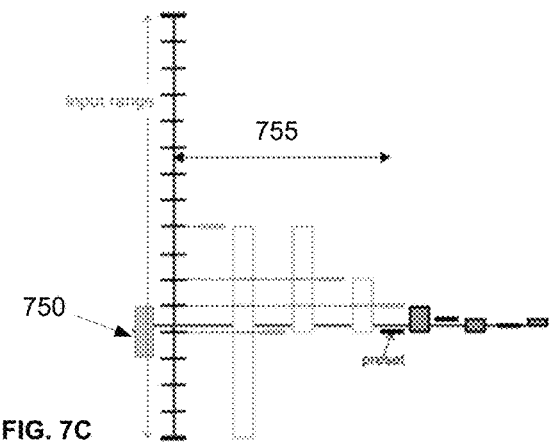

FIGS. 7A-7C illustrate an exemplary successive approximation register (SAR) based ADC 767 that can be used, as shown in FIG. 6, to subtract the cancellation signal from the measured receive signal in the analog domain and then convert the remaining signal (i.e., the component signal) to a digital component signal. Referring first to FIG. 7A, a SAR ADC 720 includes a digital-to-analog (D/A) converter and at least one comparator. Recall that the signal component cancellation system subtracts the cancellation signal from the measured received signal to reduce the bandwidth of the component signal which is provided to the feedback receiver. For example, the ADC 667 of FIG. 6 converts this lower bandwidth analog baseband component signal to a digital baseband component signal. Based on this concept, an analog pre-processing unit 710 could subtract, as a "preset value" stored in a register, the analog cancellation signal from the analog measured received signal. The resulting difference, which is the component signal in analog form, could then be provided to the SAR ADC 720 for conversion to a digital signal.

The SAR ADC 767 illustrated on the right hand side of FIG. 7A combines functions of the D/A converter of the analog pre-processing unit 710 with a D/A converter already included in the SAR 720. The combined functions are performed by D/A converter 796. When used in a signal component cancellation system, the SAR ADC 767 includes preset circuitry (e.g., a register) that is configured to store a present value of the cancellation signal, which is a digital baseband signal. As will be described below, SAR ADCs include multiple stages which perform a comparison between a result of a prior stage and remainder of the analog signal. The conversion of the analog signal is not complete until the last SAR ADC has processed the analog signal. In FIG. 7A the multiple stages are not shown for simplicity. The ADC 767 includes SAR circuitry 796 that combines the preset value with the result of the comparator 794 so that the D/A converter 796 converts this combined value into an analog signal that is subtracted from the measured receive signal. This means that the contribution of the un-selected signal components (represented by the cancellation signal) are cancelled from the measured received signal at the start of the conversion process, so that one or more SAR ADC stages may be skipped.

Referring now to FIG. 7B, the preset value stored in preset circuitry 798 is used to preset the starting point of the search algorithm of the SAR ADC. The SAR circuitry 796 includes a register into which the preset value is stored and two adders that are used to calculate the next two possible values for the comparison result. Depending on the comparator result the correct comparison value is multiplexed to the D/A converter. This implementation enables a search algorithm which is binary scaled, and also non binary scaled search algorithms with redundancy can be used.

FIG. 7C illustrates the entire input range of the SAR ADC 767 and the reduced input range 750 that is used when the preset value is taken into account. The successive approximation begins at the preset value. It can be seen that three cycles of successive approximation (denoted by range 755 and grey cycle indicators) can be skipped. This is especially beneficial because the first cycles of the successive approximation are the most power consuming due to the fact that in these cycles large capacitors are reloaded. Also the settling time for the D/A converter and the decision time of the SAR ADC is highest in the first few cycles. By skipping the first cycles, the SAR ADC can be operated with much higher strobe frequency, resulting in much higher analog bandwidth of the input signal at lower dissipation.

Referring now to FIGS. 8A-8C, if the signal bandwidth is further increased a window flash ADC can be used. A flash converter is not used for mobile phones because a flash converter would consume too much power for the needed resolution of approximately 12 bits. Even using a sub-ranging or two step architecture having first stage 820 and second stage 830 as shown in FIG. 8A, two times 64 comparators are needed.

Using the concept of subtracting a preset value that represents the transmitted signal from the signal being converted the first stage of this sub-ranging architecture can be omitted (FIG. 8B). Only a part of the whole input range is converted by the window flash architecture in FIG. 8B. In this example it is possible to realize a 12 bit converter with 8 bits for the first stage (which is the preset value representing the known digital information—the cancellation signal or even the entire transmit signal) and a four bit second stage. So a 12 bit converter with a sample rate of more than 1GS/s can be realized with a relatively low current consumption. Another advantage of this window flash embodiment is the minimal latency, which is very helpful for every regulation loop. FIGS. 8A and 8B are simple representations of the flash ADC circuit. FIG. 8C illustrates a flash ADC that uses a capacitive implementation and fully differential circuits.

Figure 9A:
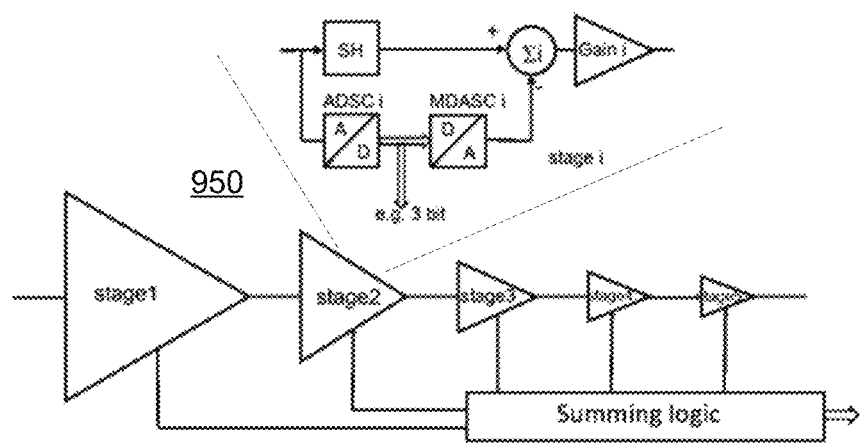
FIGS. 9A and 9B illustrate various aspects of an exemplary ADC that may be utilized in the transceiver of FIG. 6 in accordance with various aspects described.
Figure 9B:
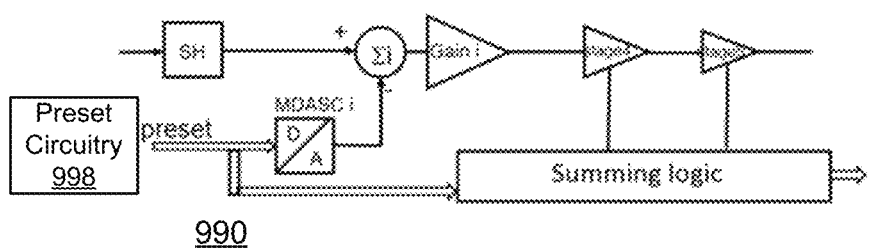

The concept of subtracting a preset value that represents the transmitted signal from the signal being converted can also be used for a pipeline A/D converter. A standard pipeline converter A/D 950 is illustrated in FIG. 9A. Each stage of the pipeline converter includes a D/A converter that converts the result of the prior stage to an analog signal that is subtracted from the analog signal being converted. FIG. 9B illustrates that, by replacing the first stages and using the preset value representing the cancellation signal or even the entire transmit signal, some of the early stages of the pipeline converter can be skipped. Changing the design of a pipeline ADC is a little bit more complicated, because not only are the first stages skipped, but the analog processing in the multiplying amplifiers has to be changed. Nevertheless also for pipeline the first stages consume significant power because of noise and linearity limitations.

Figure 10:
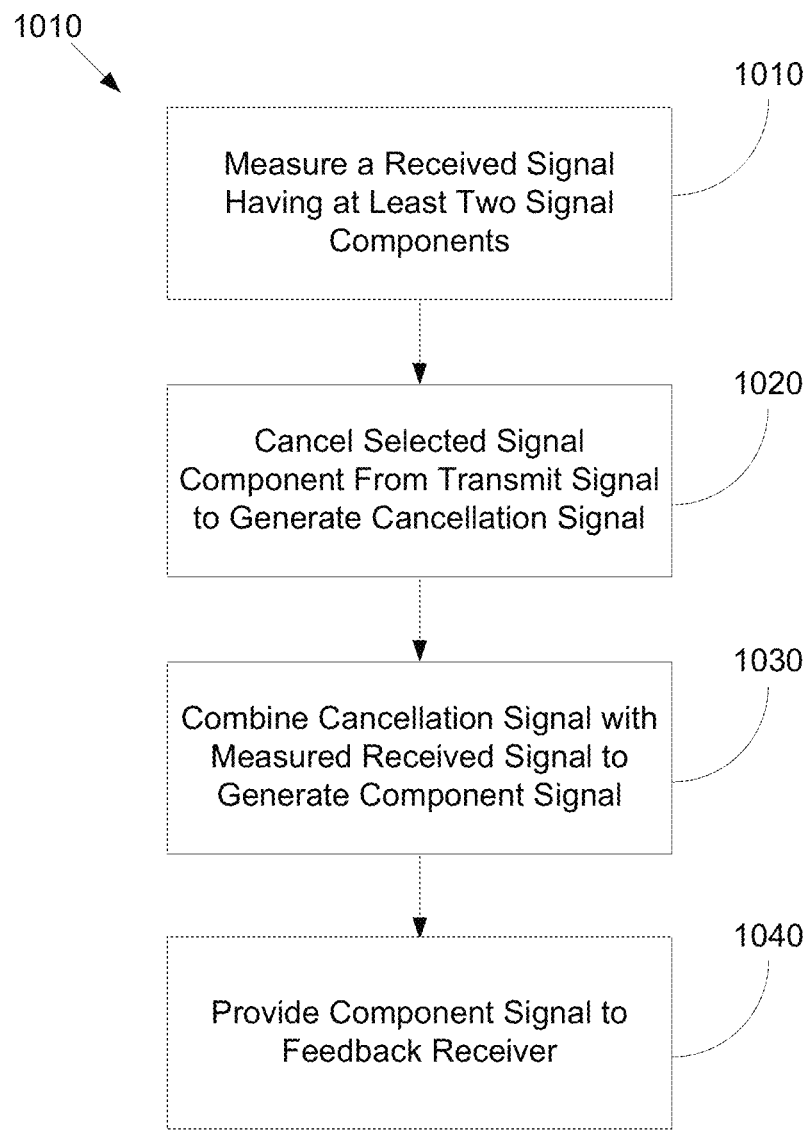
FIG. 10 illustrates an exemplary flow diagram of an exemplary method of cancelling signal components from a signal in accordance with various aspects described.

FIG. 10 illustrates a flow diagram outlining an exemplary method 1000 that cancels a selected signal component from a received signal. The method 1000 may be performed, for example, by the signal component cancellation systems of FIGS. 1-6. The method includes, at 1010, in a feedback path, measuring a received signal that results from feedback of a transmit signal having at least two signal components with offset center frequencies. At 1020 the selected signal component is cancelled from the transmit signal in a cancellation path to generate a cancellation signal. The method includes, at 1030, combining the cancellation signal with the measured received signal to generate a component signal corresponding to a contribution of the selected signal component to the measured received signal. The component signal is provided to a feedback receiver at 1040.

It can be seen from the foregoing description that the disclosed systems, methods, and circuitries can reduce the bandwidth requirement of feedback receivers by cancelling selected signal components from a measured received signal.

Figure 11:
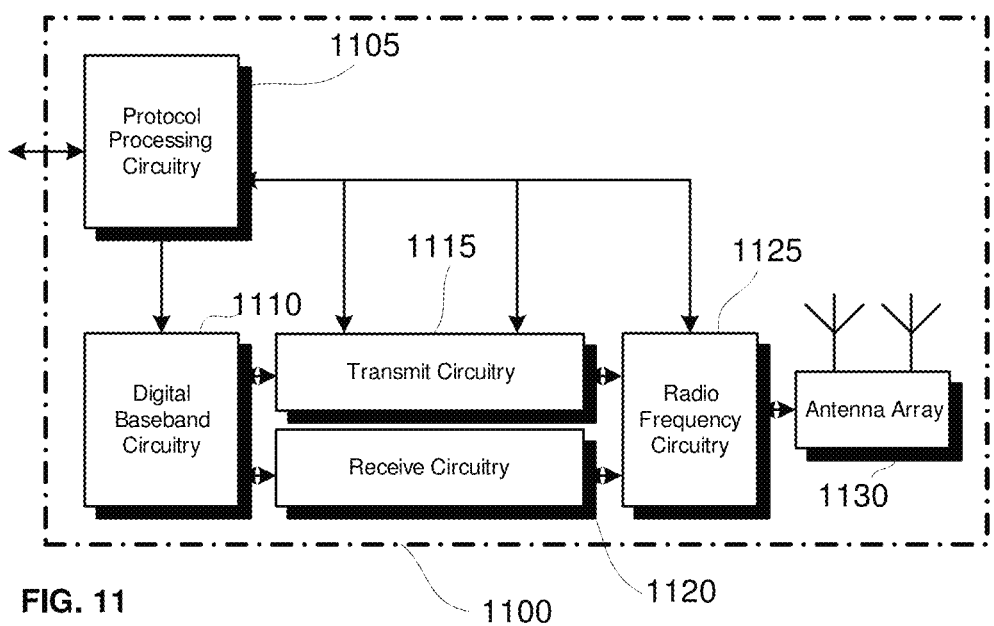
FIG. 11 illustrates an exemplary millimeter wave communication circuitry 1100 according to some aspects.

FIG. 11 illustrates an exemplary millimeter wave communication circuitry 1100 according to some aspects. Circuitry 1100 is alternatively grouped according to functions. Components as shown in 1100 are shown here for illustrative purposes and may include other components not shown here in FIG. 11.

Millimeter wave communication circuitry 1100 may include protocol processing circuitry 1105, which may implement one or more of medium access control (MAC), radio link control (RLC), packet data convergence protocol (PDCP), radio resource control (RRC) and non-access stratum (NAS) functions. Protocol processing circuitry 1105 may include one or more processing cores (not shown) to execute instructions and one or more memory structures (not shown) to store program and data information.

Millimeter wave communication circuitry 1100 may further include digital baseband circuitry 1110, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 1100 may further include transmit circuitry 1115, receive circuitry 1120 and/or antenna array circuitry 1130.

Millimeter wave communication circuitry 1100 may further include radio frequency (RF) circuitry 1125. In an aspect of the invention, RF circuitry 1125 may include multiple parallel RF chains for one or more of transmit or receive functions, each connected to one or more antennas of the antenna array 1130. The component signal cancellation systems, methods, and circuitries described herein may be included in one or more of the parallel RF chains.

In an aspect of the disclosure, protocol processing circuitry 1105 may include one or more instances of control circuitry (not shown) to provide control functions for one or more of digital baseband circuitry 1110, transmit circuitry 1115, receive circuitry 1120, and/or radio frequency circuitry 1125.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for cancelling signal components from a measured received signal according to embodiments and examples described herein.

Example 1 is a signal component cancellation system for a feedback receiver, including a transmit chain, measurement circuitry, cancellation circuitry, and subtraction circuitry. The transmit chain is configured to transmit a transmit signal having at least two signal components with offset center frequencies. The measurement circuitry is configured to measure a received signal that results from feedback of the transmit signal. The cancellation circuitry is configured to cancel a selected signal component from the transmit signal to generate a cancellation signal. The subtraction circuitry is configured to combine the cancellation signal with the measured received signal to generate a component signal corresponding to a contribution of the selected signal component to the received signal and provide the component signal to the feedback receiver.

Example 2 includes the subject matter of example 1, including or omitting optional elements, wherein the cancellation circuitry includes component carrier selector circuitry configured to receive the at least two signal components and pass signal components that are not the selected signal component and combination circuitry configured to add the signal components passed by the component carrier selector circuitry to generate an unwanted component signal.

Example 3 includes the subject matter of example 2, including or omitting optional elements, wherein the cancellation circuitry further includes signal adjuster circuitry configured to adjust a phase, magnitude, and time delay of each of the passed signal components to align the passed signal components with a phase and magnitude of the measured received signal, wherein the combination circuitry combines the adjusted passed signal components to generate the unwanted signal component.

Example 4 includes the subject matter of example 2, including or omitting optional elements, wherein the cancellation circuitry further includes signal adjuster circuitry configured to adjust a phase, magnitude, and time delay of the unwanted component signal to align the unwanted component signal with a phase and magnitude of the measured received signal.

Example 5 includes the subject matter of example 2, including or omitting optional elements, wherein the cancellation circuitry further includes a frequency shifter configured to shift a frequency of the unwanted component signal by a center frequency of the selected signal component to generate the cancellation signal.

Example 6 includes the subject matter of example 1, including or omitting optional elements, wherein the subtraction circuitry includes a mixer configured to down-convert the measured received signal based on a center frequency of the selected signal component and a subtractor element configured to subtract the cancellation signal from the down-converted measured received signal to generate the component signal.

Example 7 includes the subject matter of example 1, including or omitting optional elements, wherein the subtraction circuitry includes a first mixer configured to up-convert the cancellation signal based on a transmit frequency; a subtractor element configured to subtract the up-converted cancellation signal from the measured received signal to generate the component signal; and a second mixer configured to down-convert the component signal based on a center frequency of the selected signal component.

Example 8 includes the subject matter of example 7, including or omitting optional elements, wherein the subtractor element is configured to provide the component signal to a low noise amplifier disposed between the subtractor element and the second mixer.

Example 9 includes the subject matter of example 7, including or omitting optional elements, wherein the subtractor element is configured to subtract the cancellation signal from an output of a low noise amplifier that amplifies the measured received signal.

Example 10 includes the subject matter of example 1, including or omitting optional elements, wherein the subtraction circuitry includes a mixer configured to down-convert the measured received signal based on a center frequency of the selected signal component and an analog-to-digital converter (ADC) configured to subtract the cancellation signal from the down-converted measured received signal and convert a difference between the down-converted measured received signal and the cancellation signal to a digital component signal.

Example 11 includes the subject matter of example 10, including or omitting optional elements, wherein the ADC includes a sigma-delta ADC.

Example 12 includes the subject matter of example 1, including or omitting optional elements, wherein the subtraction circuitry includes a mixer configured to down-convert the measured received signal based on a center frequency of the selected signal component and an analog-to-digital converter (ADC) configured to subtract the cancellation signal from the down-converted measured received signal in an analog domain and convert a difference between the down-converted measured received signal and the cancellation signal to a digital component signal.

Example 13 includes the subject matter of example 12, including or omitting optional elements, wherein the ADC includes a digital-to-analog converter configured to convert the down-converted measured received signal to a digital signal and preset circuitry configured to select a preset value based on the cancellation signal and control the digital-to-analog converter to process a difference between the preset value and the down-converted measured received signal to generate the component signal.

Example 14 includes the subject matter of example 1, including or omitting optional elements, wherein the measurement circuitry includes measurement selector circuitry configured to control the measurement circuitry to measure a selected one of a forward wave or a reflected wave component of the transmit signal.

Example 15 is a method that includes in a feedback path, measuring a received signal that results from feedback of a transmit signal having at least two signal components with offset center frequencies; in a cancellation path, cancelling a selected signal component from the transmit signal to generate a cancellation signal; combining the cancellation signal with the measured received signal to generate a component signal corresponding to a contribution of the selected signal component to the measured received signal; and providing the component signal to a feedback receiver.

Example 16 includes the subject matter of example 15, including or omitting optional elements, further including receiving, separately, the at least two signal components; passing signal components that are not the selected signal component; adjusting a phase, magnitude, and time delay of each of the passed signal components to align the passed signal components with a phase and magnitude of the measured received signal; adding the adjusted passed signal components to generate an unwanted component signal; and shifting a frequency of the unwanted component signal by a center frequency of the selected signal component to generate the cancellation signal.

Example 17 includes the subject matter of example 15, including or omitting optional elements, further including receiving, separately, the at least two signal components; passing signal components that are not the selected signal component; adding the passed signal components to generate an unwanted component signal; adjusting a phase, magnitude, and time delay of the unwanted component signal to align the unwanted component signal with a phase and magnitude of the measured received signal; and shifting a frequency of the adjusted unwanted component signal by a center frequency of the selected signal component to generate the cancellation signal.

Example 18 includes the subject matter of example 15, including or omitting optional elements, further including down-converting the measured received signal based on a center frequency of the selected signal component; and subtracting the cancellation signal from the down-converted measured received signal to generate the component signal.

Example 19 includes the subject matter of example 15, including or omitting optional elements, further including up-converting the cancellation signal based on a transmit frequency; and subtracting the up-converted cancellation signal from the measured received signal to generate the component signal; and down-converting the component signal based on a center frequency of the selected signal component.

Example 20 includes the subject matter of example 15, including or omitting optional elements, further including down-converting the measured received signal based on a center frequency of the selected signal component; and with an analog-to-digital converter (ADC): subtracting the cancellation signal from the down-converted measured received signal and converting a difference between the down-converted measured received signal and the cancellation signal to a digital component signal.

Example 21 is cancellation circuitry configured to generate a cancellation signal to cancel a selected signal component from a transmit signal having at least two signal components with offset center. The cancellation circuitry includes component carrier selector circuitry configured to receive the at least two signal components and pass signal components that are not the selected signal component. The cancellation circuitry includes signal adjuster circuitry configured to adjust a phase, magnitude, and time delay of each of the passed signal components to align the passed signal components with a phase and magnitude of a measured received signal. The cancellation circuitry includes combination circuitry configured to add the signal components passed by the component carrier selector circuitry to generate an unwanted component signal. The cancellation circuitry includes a frequency shifter configured to shift a frequency of the unwanted component signal by a center frequency of the selected signal component to generate the cancellation signal. The cancellation signal is provided to subtraction circuitry.

Example 22 includes the subject matter of example 21, including or omitting optional elements, wherein the signal adjuster circuitry includes a finite impulse response (FIR) filter for each of the signal components in the transmit signal.

Example 23 is cancellation circuitry configured to generate a cancellation signal to cancel a selected signal component from a transmit signal having at least two signal components with offset center. The cancellation circuitry includes component carrier selector circuitry configured to receive the at least two signal components and pass signal components that are not the selected signal component. The cancellation circuitry includes combination circuitry configured to add the signal components passed by the component carrier selector circuitry to generate an unwanted component signal. The cancellation circuitry includes signal adjuster circuitry configured to adjust a phase, magnitude, and time delay of the unwanted component signal to align the unwanted component signal with a phase and magnitude of a measured received signal. The cancellation circuitry includes a frequency shifter configured to shift a frequency of the adjusted unwanted component signal by a center frequency of the selected signal component to generate the cancellation signal. The cancellation signal is provided to subtraction circuitry.

Example 24 includes the subject matter of example 23, wherein the signal adjuster circuitry includes a finite impulse response (FIR) filter.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general purpose processor executing instructions stored in computer readable medium.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

What is claimed is:

1. A signal component cancellation system for a feedback receiver, comprising:
   a transmit chain configured to transmit a transmit signal having at least two signal components with offset center frequencies;
   measurement circuitry configured to measure a received signal that results from feedback of the transmit signal;
   cancellation circuitry configured to cancel a selected signal component from the transmit signal to generate a cancellation signal; and
   subtraction circuitry configured to:
      combine the cancellation signal with the measured received signal to generate a component signal corresponding to a contribution of the selected signal component to the received signal; and
      provide the component signal to the feedback receiver.

2. The signal component cancellation system of claim 1, wherein the cancellation circuitry comprises:
   component carrier selector circuitry configured to:
      receive the at least two signal components; and
      pass signal components that are not the selected signal component; and
   combination circuitry configured to add the signal components passed by the component carrier selector circuitry to generate an unwanted component signal.

3. The signal component cancellation system of claim 2, wherein the cancellation circuitry further comprises signal adjuster circuitry configured to adjust a phase, magnitude, and time delay of each of the passed signal components to align the passed signal components with a phase and magnitude of the measured received signal, wherein the combination circuitry combines the adjusted passed signal components to generate the unwanted component signal.

4. The signal component cancellation system of claim 2, wherein the cancellation circuitry further comprises signal adjuster circuitry configured to adjust a phase, magnitude, and time delay of the unwanted component signal to align the unwanted component signal with a phase and magnitude of the measured received signal.

5. The signal component cancellation system of claim 2, wherein the cancellation circuitry further comprises a frequency shifter configured to shift a frequency of the unwanted component signal by a center frequency of the selected signal component to generate the cancellation signal.

6. The signal component cancellation system of claim 1, wherein the subtraction circuitry comprises:
   a mixer configured to down-convert the measured received signal based on a center frequency of the selected signal component; and
   a subtractor element configured to subtract the cancellation signal from the down-converted measured received signal to generate the component signal.

7. The signal component cancellation system of claim 1, wherein the subtraction circuitry comprises:
   a first mixer configured to up-convert the cancellation signal based on a transmit frequency; and
   a subtractor element configured to subtract the up-converted cancellation signal from the measured received signal to generate the component signal; and
   a second mixer configured to down-convert the component signal based on a center frequency of the selected signal component.

8. The signal component cancellation system of claim 7, wherein the subtractor element is configured to provide the component signal to a low noise amplifier disposed between the subtractor element and the second mixer.

9. The signal component cancellation system of claim 7, wherein the subtractor element is configured to subtract the cancellation signal from an output of a low noise amplifier that amplifies the measured received signal.

10. The signal component cancellation system of claim 1, wherein the subtraction circuitry comprises:
    a mixer configured to down-convert the measured received signal based on a center frequency of the selected signal component; and
    an analog-to-digital converter (ADC) configured to:
       subtract the cancellation signal from the down-converted measured received signal; and
       convert a difference between the down-converted measured received signal and the cancellation signal to a digital component signal.

11. The signal component cancellation system of claim 10, wherein the ADC comprises a sigma-delta ADC.

12. The signal component cancellation system of claim 1, wherein the subtraction circuitry comprises:

a mixer configured to down-convert the measured received signal based on a center frequency of the selected signal component; and an analog-to-digital converter (ADC) configured to:
  subtract the cancellation signal from the down-converted measured received signal in an analog domain; and
  convert a difference between the down-converted measured received signal and the cancellation signal to a digital component signal.

13. The signal component cancellation system of claim 12, wherein the ADC comprises:
  a digital-to-analog converter configured to convert the down-converted measured received signal to an analog signal; and
  preset circuitry configured to:
    select a preset value based on the cancellation signal; and
    control the digital-to-analog converter to process a difference between the preset value and the down-converted measured received signal to generate the component signal.

14. The signal component cancellation system of claim 1, wherein the measurement circuitry comprises measurement selector circuitry configured to control the measurement circuitry to measure a selected one of a forward wave or a reflected wave component of the transmit signal.

15. A method, comprising:
  in a feedback path, measuring a received signal that results from feedback of a transmit signal having at least two signal components with offset center frequencies;
  in a cancellation path, cancelling a selected signal component from the transmit signal to generate a cancellation signal;
  combining the cancellation signal with the measured received signal to generate a component signal corresponding to a contribution of the selected signal component to the measured received signal; and
  providing the component signal to a feedback receiver.

16. The method of claim 15, further comprising:
  receiving, separately, the at least two signal components;
  passing signal components that are not the selected signal component;
  adjusting a phase, magnitude, and time delay of each of the passed signal components to align the passed signal components with a phase and magnitude of the measured received signal;
  adding the adjusted passed signal components to generate an unwanted component signal; and
  shifting a frequency of the unwanted component signal by a center frequency of the selected signal component to generate the cancellation signal.

17. The method of claim 15, further comprising:
  receiving, separately, the at least two signal components;
  passing signal components that are not the selected signal component;
  adding the passed signal components to generate an unwanted component signal;
  adjusting a phase, magnitude, and time delay of the unwanted component signal to align the unwanted component signal with a phase and magnitude of the measured received signal; and
  shifting a frequency of the adjusted unwanted component signal by a center frequency of the selected signal component to generate the cancellation signal.

18. The method of claim 15, further comprising:
  down-converting the measured received signal based on a center frequency of the selected signal component; and
  subtracting the cancellation signal from the down-converted measured received signal to generate the component signal.

19. The method of claim 15, further comprising:
  up-converting the cancellation signal based on a transmit frequency; and
  subtracting the up-converted cancellation signal from the measured received signal to generate the component signal; and
  down-converting the component signal based on a center frequency of the selected signal component.

20. The method of claim 15, further comprising:
  down-converting the measured received signal based on a center frequency of the selected signal component; and
  with an analog-to-digital converter (ADC):
    subtracting the cancellation signal from the down-converted measured received signal; and
    converting a difference between the down-converted measured received signal and the cancellation signal to a digital component signal.

21. Cancellation circuitry configured to generate a cancellation signal to cancel a selected signal component from a transmit signal having at least two signal components with offset center, the cancellation circuitry comprising:
  component carrier selector circuitry configured to:
    receive the at least two signal components; and
    pass signal components that are not the selected signal component;
  signal adjuster circuitry configured to adjust a phase, magnitude, and time delay of each of the passed signal components to align the passed signal components with a phase and magnitude of a measured received signal;
  combination circuitry configured to add the signal components passed by the component carrier selector circuitry to generate an unwanted component signal;
  a frequency shifter configured to shift a frequency of the unwanted component signal by a center frequency of the selected signal component to generate the cancellation signal; and
  wherein the cancellation signal is provided to subtraction circuitry.

22. The cancellation circuitry of claim 21, wherein the signal adjuster circuitry comprises a finite impulse response (FIR) filter for each of the signal components in the transmit signal.

23. Cancellation circuitry configured to generate a cancellation signal to cancel a selected signal component from a transmit signal having at least two signal components with offset center, the cancellation circuitry comprising:
  component carrier selector circuitry configured to:
    receive the at least two signal components; and
    pass signal components that are not the selected signal component;
  combination circuitry configured to add the signal components passed by the component carrier selector circuitry to generate an unwanted component signal;
  signal adjuster circuitry configured to adjust a phase, magnitude, and time delay of the unwanted component signal to align the unwanted component signal with a phase and magnitude of a measured received signal;

a frequency shifter configured to shift a frequency of the adjusted unwanted component signal by a center frequency of the selected signal component to generate the cancellation signal; and wherein the cancellation signal is provided to subtraction circuitry.

24. The cancellation circuitry of claim 23, wherein the signal adjuster circuitry comprises a finite impulse response (FIR) filter.

* * * * *